(12) United States Patent
Chang et al.

(10) Patent No.: US 11,871,146 B1
(45) Date of Patent: Jan. 9, 2024

(54) VIDEO PROCESSOR FOR HANDLING IRREGULAR INPUT

(71) Applicant: NOVATEK Microelectronics Corp., Hsin-Chu (TW)

(72) Inventors: Chih Chang, Hsinchu (TW); I-Feng Lin, Hsinchu County (TW); Hsiao-En Chang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 7 days.

(21) Appl. No.: 17/889,368

(22) Filed: Aug. 16, 2022

(51) Int. Cl.
*G06F 5/00* (2006.01)
*H04N 7/01* (2006.01)

(52) U.S. Cl.
CPC .............................. *H04N 7/0135* (2013.01)

(58) Field of Classification Search
CPC .................................................. H04N 7/0135
See application file for complete search history.

(56) References Cited

U.S. PATENT DOCUMENTS

| | | | | |
|---|---|---|---|---|
| 7,990,389 B2 * | 8/2011 | Barone | ................. | G06T 15/005 345/475 |
| 8,107,007 B2 * | 1/2012 | Ogino | .................... | H04N 7/015 348/452 |
| 8,175,121 B2 * | 5/2012 | Fukuda | ................ | H04N 7/0142 348/441 |
| 8,184,200 B1 * | 5/2012 | Biswas | .................. | H04N 7/014 348/452 |
| 8,237,859 B2 * | 8/2012 | Lu | ......................... | H04N 7/0132 348/451 |
| 8,259,790 B2 * | 9/2012 | Alfonso | ............... | H04N 7/0105 348/E7.013 |
| 8,319,898 B2 * | 11/2012 | Ueno | ................... | G09G 3/3611 348/625 |
| 8,487,981 B2 * | 7/2013 | Hulyalkar | ............ | H04N 13/139 348/42 |
| 8,610,826 B2 * | 12/2013 | Wu | ........................ | H04N 5/213 348/452 |
| 9,137,569 B2 * | 9/2015 | Liang | .................. | H04N 21/2353 |
| 9,384,568 B2 * | 7/2016 | Steen | .................. | G01S 15/8977 |
| 9,609,331 B2 * | 3/2017 | Liang | ................... | H04N 21/435 |
| 10,097,765 B2 * | 10/2018 | Sheikh | .................... | H04N 23/68 |
| 10,225,587 B1 * | 3/2019 | Tian | ............... | H04N 21/234381 |
| 10,230,920 B1 * | 3/2019 | Yang | ........................ | G09G 5/12 |
| 10,349,005 B2 * | 7/2019 | Gilmutdinov | ........ | H04N 7/0142 |
| 10,631,002 B2 * | 4/2020 | Li | ........................ | H04N 19/147 |
| 11,032,511 B1 * | 6/2021 | Ge | ........................ | H04N 7/0147 |
| 11,233,970 B2 * | 1/2022 | Song | .................... | H04N 7/0135 |
| 11,277,632 B2 * | 3/2022 | Fishwick | ............. | H04N 19/176 |
| 11,503,248 B1 * | 11/2022 | Chang | .................... | H04N 7/013 |
| 2017/0064325 A1 * | 3/2017 | Lim | ...................... | H04N 19/51 |

\* cited by examiner

*Primary Examiner* — Cheng Yuan Tseng
(74) *Attorney, Agent, or Firm* — Winston Hsu

(57) ABSTRACT

A video processor is configured to perform the following steps: receiving a series of input frames; calculating a buffer stage value according to the series of input frames, wherein the buffer stage value corresponds to a status of the input frames stored in a frame buffer of the video processor; and selecting a frame set from the input frames stored in the frame buffer for generating an interpolated frame as an output frame to be output by the video processor according to the buffer stage value.

21 Claims, 4 Drawing Sheets

VIDEO PROCESSOR FOR HANDLING IRREGULAR INPUT

BACKGROUND OF THE INVENTION

1. Field of the Invention

The present invention relates to a video processor used for motion estimation and motion compensation (MEMC), and more particularly, to a video processor for handling irregular input in the MEMC.

2. Description of the Prior Art

Motion estimation and motion compensation (MEMC) is a technology used for frame interpolation, which allows a series of image frames to be displayed with a higher frame rate. For example, if a 30 Hz source video such as a film is required to be displayed in 60 Hz, an interpolated frame should be added between every two adjacent input frames of the source video, so as to double the frame rate.

Supposing that the frame rate of a source video from a video provider is 24 Hz and the image to be shown on the display panel is 60 Hz, every two input frames are converted into five output frames through a frame conversion technique. In order to prevent judders appearing on the output video, a cadence specifying the film mode 32 is used to perform the interpolation, where two input frames are incorporated to generate at least one interpolated frame. The MEMC operation allows the video processor to determine appropriate input frames and apply a correct phase coefficient to perform interpolation, allowing the output video to be smooth.

Conventionally, when the video processor obtains the information of the input frames and output frames and thereby determines the film mode, a corresponding table recording the input frames and related phase information is applied to perform interpolation, and the video processor may generate the interpolated frames by referring to the table. However, if the input frames do not follow the input rule but the interpolating operations are still based on the table, the video processor may take wrong source input frames and/or use wrong phase coefficients to perform interpolation, resulting in an image jitter in the output video. For example, in a mobile phone where the video processor receives input frames based on the command mode of the mobile industry processor interface (MIPI) standard, the input timing of the input frames may easily be interfered with by the status of the central processing unit (CPU) or graphics processing unit (GPU); hence, the input images may be delayed if the GPU is busy. The delay or irregularity of input timing is usually hard to predict, and thus the conventional method of referring to the table may not appropriately handle this irregular input problem.

For example, in an application where a 24 Hz input video is converted into a 60 Hz output video, every 2 input frames are used to generate 5 output frames; hence, the input update signal, which is used to indicate the reception of input frames, may usually have a repeated sequence "10010", as shown in Table 1. By referring to a reference table, the phase step may equal 2/5 such that the phase coefficients will be in an iterative sequence 0, 2/5, 4/5, 1/5 and 3/5, and the interpolated frames are generated by using the current input frame and the previous input frame with the corresponding phase coefficients.

TABLE 1

| | Index | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Input frame | A | | | B | | | C | | D | | E | | | F | |
| Input update | 1 | 0 | 0 | 1 | 0 | 0 | 1 | 0 | 1 | 0 | 1 | 0 | 0 | 1 | 0 |
| Phase step | 2/5 | 2/5 | 2/5 | 2/5 | 2/5 | 2/5 | 2/5 | 2/5 | 2/5 | 2/5 | 2/5 | 2/5 | 2/5 | 2/5 | 2/5 |
| Current frame | A | A | A | B | B | B | C | C | D | D | E | E | E | F | F |
| Previous frame | Z | Z | Z | A | A | A | B | B | C | C | D | D | D | E | E |
| Phase coefficient | 0 | 2/5 | 4/5 | 1/5 | 3/5 | 0 | 2/5 | 4/5 | 1/5 | 3/5 | 0 | 2/5 | 4/5 | 1/5 | 3/5 |

However, as shown in Table 1, the input frame C is expected to arrive at the output frame period index 6, but is delayed and arrives at the next output frame period index 7. According to the reference table, the video processor will take the input frames B and A from the specified frame buffers to generate the interpolated frame for index 6 since the input frame C has not arrived. Therefore, from index 5 to index 6, the same frame set is selected to perform interpolation but the phase coefficients change from 3/5 to 0, causing the output video to move back abnormally, which may easily generate an image jitter in the output video.

This problem may also occur in the application with cadence or pulldown where the input frames are received in 60 Hz with repeated frames and the output frames are output in 60 Hz, as shown in Table 2.

TABLE 2

| | Index | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Input frame | A1 | A2 | A3 | B1 | B2 | B3 | C1 | C2 | D1 | D2 | E1 | E2 | E3 | F1 | F2 |
| Input update | 1 | 1 | 1 | 1 | 1 | 1 | 1 | 1 | 1 | 1 | 1 | 1 | 1 | 1 | 1 |
| Frame difference | 1 | 0 | 0 | 1 | 0 | 0 | 1 | 0 | 1 | 0 | 1 | 0 | 0 | 1 | 0 |

TABLE 2-continued

| | Index | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Phase step | 2/5 | 2/5 | 2/5 | 2/5 | 2/5 | 2/5 | 2/5 | 2/5 | 2/5 | 2/5 | 2/5 | 2/5 | 2/5 | 2/5 | 2/5 |
| Current frame | A | A | A | B | B | B | C | C | D | D | E | E | E | F | F |
| Previous frame | Z | Z | Z | A | A | A | B | B | C | C | D | D | D | E | E |
| Phase coefficient | 0 | 2/5 | 4/5 | 1/5 | 3/5 | 0 | 2/5 | 4/5 | 1/5 | 3/5 | 0 | 2/5 | 4/5 | 1/5 | 3/5 |

In this case, the input frames A2 and A3 are duplicated from the input frame A1, the input frames B2 and B3 are duplicated from the input frame B1, the input frame C2 is duplicated from the input frame C1, and so on. The frame difference value indicates whether the currently received input frame is different from the previous input frame or otherwise duplicated from the previous input frame. Similarly, the output video moves back abnormally in the output frame period index 6 due to the delay of the input frame C1.

Thus, there is a need for improvement over the prior art.

SUMMARY OF THE INVENTION

It is therefore an objective of the present invention to provide an image processing method used for the video processor, to handle the problem of irregular input by determining the abnormal situations and correspondingly selecting the frame set and calculating the phase step, so as to solve the abovementioned problems.

An embodiment of the present invention discloses a video processor, which is configured to perform the following steps: receiving a series of input frames; calculating a buffer stage value according to the series of input frames, wherein the buffer stage value corresponds to a status of the input frames stored in a frame buffer of the video processor; and selecting a frame set from the input frames stored in the frame buffer for generating an interpolated frame as an output frame to be output by the video processor according to the buffer stage value.

Another embodiment of the present invention discloses a video processor, which is configured to perform the following steps: receiving a series of input frames; determining an expected input gap value according to a relativity of an input frame rate of the series of input frames and an output frame rate of a series of output frames output by the video processor; determining whether an actual input gap value is different from the expected input gap value; calculating a phase step when the actual input gap value is determined to be different from the expected input gap value to obtain the phase step which is different from a regular phase step determined based on the relativity of the input frame rate and the output frame rate; and generating an interpolated frame to be output as an output frame among the series of output frames based on a selected frame set by using the calculated phase step.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
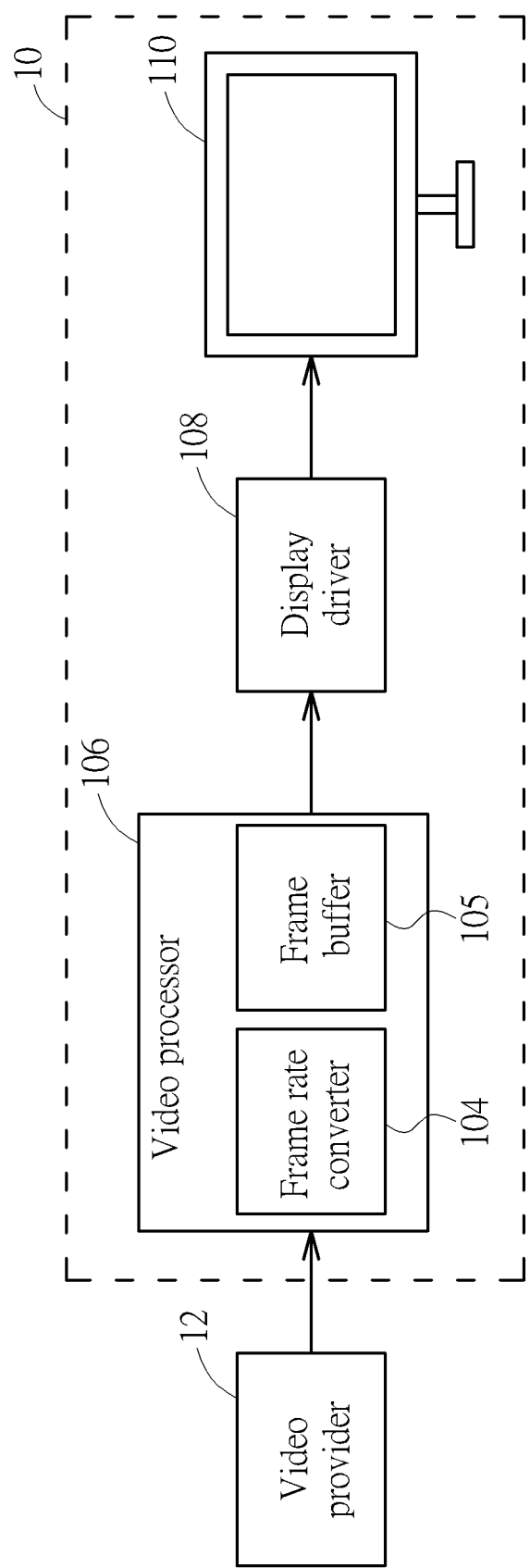
FIG. 1 is a schematic diagram of a display system according to an embodiment of the present invention.

FIG. 1 is a schematic diagram of a display system 10 according to an embodiment of the present invention. As shown in FIG. 1, the display system 10 such as a television (TV) or a screen may receive and display a source video having a series of image frames provided by a video provider 12 such as a digital video disc (DVD) player or a video streaming service provider communicated with the display system 10 via a wired network or a wireless network. The display system 10 includes a video processor 106, a display driver 108 and a display panel 110. In general, the frame rate of the source video may not be the same as the frame rate to be displayed on the display panel 110. The video processor 106 may include a video controller integrated circuit (IC) and a frame rate conversion (FRC) IC for converting the source video which usually has a lower frame rate to generate a series of output frames of a higher frame rate to be displayed by the display panel 110. Alternatively, the video processor 106 may be a video controller IC embedded with a function of FRC. That is, the frame rate converter 104 depicted in FIG. 1 can be regarded as a stand-alone FRC IC or an internal FRC circuit inside the video controller IC. In this embodiment, when receiving a 24 Hz input video having two input frames A and B, the frame rate converter 104 may convert the 2 input frames A and B into 5 image frames A, A, A, B, B in 60 Hz, and the video processor 106 may perform motion estimation and motion compensation (MEMC) to generate appropriate interpolated frames based on these image frames.

In another embodiment, the video processor 106 may include a graphics processing unit (GPU) and a stand-alone FRC IC, or the video processor 106 may be a GPU with the internal FRC circuit inside the GPU.

The video processor 106 may further include a frame buffer 105. The frame buffer 105 is used to store the received input frames, so that the video processor 106 may perform interpolation by taking the selected input frames from the frame buffer 105. In this embodiment, the frame buffer 105 is integrated with the video processor 106, e.g., in a video controller IC. In another embodiment, the video processor 106 may access the input frames from one or more separated frame buffers, which are external memory devices apart from the video processor 106.

The display driver 108 may convert the image data into data voltage signals and drive the display panel 110 to display the image frames through the data voltage signals.

The display driver 108 may include a timing controller, a source driver, a gate driver, and/or any other devices capable of driving the display panel 110. The display panel 110 may be of any type such as a liquid crystal display (LCD) panel, light-emitting diode (LED) display, and plasma display panel (PDP), but not limited thereto.

As mentioned above, the conventional video processor may generate the interpolated frame by taking a frame set and using a phase coefficient determined based on a reference table, where the frame selection and the related phase coefficients are predetermined based on the information of the input frame rate and output frame rate and recorded in the table; hence, the output image frames may not be normally generated if the input frames do not follow the expected input timing. In order to solve or mitigate this problem, the present invention provides a method of dynamically determining the frame set and phase step/coefficient to be used for interpolation in each output frame period. The appropriate selection of the current frame and the previous frame used for interpolation and the recalculation of the phase step and phase coefficient allow the output video to become smoother, so as to minimize the influences of irregular input timing.

stage value may represent the number of input frames in the frame buffer that have not been used to generate the interpolated frame through the interpolation operation. The buffer stage value may be used by the video processor to monitor the status of input frames stored in the frame buffer. The video processor thereby selects the frame set from the frame buffer to be used for generating the interpolated frame as an output frame according to the buffer stage value (Step 206).

Table 3 lists the buffer stage values in multiple continuous output frame periods under an input timing of a series of input frames. Table 3 further lists the frame set, including a current frame and a previous frame, used for generating the interpolated frame and the corresponding phase coefficient in each output frame period denoted by an index value. The interpolated frame may be used as an output frame output to the back-end display driver and display panel from the video processor. A new phase start indication and a buffer stage value are also listed in Table 3. Table 3 shows the case where a 24 Hz input video is converted into a 60 Hz output video, and the phase step is 2/5 and the phase coefficients have an iterative sequence 2/5, 4/5, 1/5 and 3/5.

TABLE 3

| | Index | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Input frame | A | | | B | | C | | D | | | E | | | F | |
| Input update | 1 | 0 | 0 | 1 | 0 | 1 | 0 | 1 | 0 | 0 | 1 | 0 | 0 | 1 | 0 |
| New phase start | 1 | | | 1 | | 1 | | | 1 | | 1 | | | 1 | |
| Buffer stage | 0 | 0 | 0 | 0 | 0 | 0 | 0 | 1 | 0 | 0 | 0 | 0 | 0 | 0 | 0 |
| Current frame | A | A | A | B | B | C | C | C | D | D | E | E | E | F | F |
| Previous frame | Z | Z | Z | A | A | B | B | B | C | C | D | D | D | E | E |
| Phase coefficient | 0 | 2/5 | 4/5 | 1/5 | 3/5 | 0 | 2/5 | 4/5 | 1/5 | 3/5 | 0 | 2/5 | 4/5 | 1/5 | 3/5 |

Figure 2:
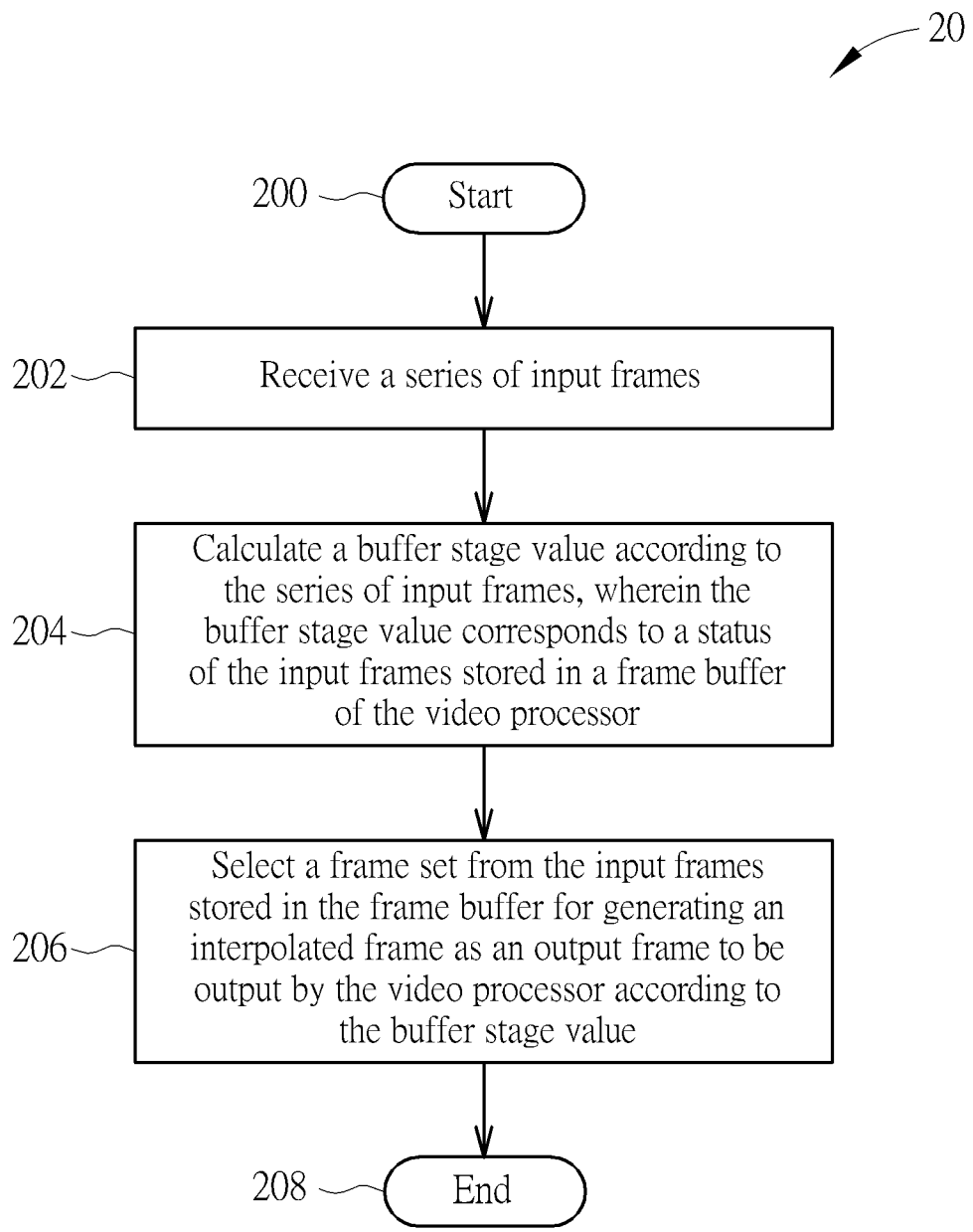
FIG. 2 is a flowchart of an image processing process according to an embodiment of the present invention.

FIG. 2 is a flowchart of an image processing process 20 according to an embodiment of the present invention. The image processing process 20 may be implemented in a video processor, such as the video processor 106 shown in FIG. 1. As shown in FIG. 2, the image processing process 20 includes the following steps:

Step 200: Start.

Step 202: Receive a series of input frames.

Step 204: Calculate a buffer stage value according to the series of input frames, wherein the buffer stage value corresponds to a status of the input frames stored in a frame buffer of the video processor.

Step 206: Select a frame set from the input frames stored in the frame buffer for generating an interpolated frame as an output frame to be output by the video processor according to the buffer stage value.

Step 208: End.

According to the image processing process 20, the video processor may receive a series of input frames (Step 202). In an embodiment, the series of input frames may be received by the video processor from a front-end device. The front-end device may be the video provider 12 shown in FIG. 1.

In each output frame period where an input frame is received or no input frame is received, the video processor may calculate a buffer stage value according to the received input frame(s) (Step 204). The buffer stage value corresponds to the status of the input frames stored in a frame buffer of the video processor. More specifically, the buffer In detail, a series of input frames A, B, C, D, E and F . . . are received by the video processor. The input update signal is used to indicate the reception of input frames, where the value 1 indicates that an input frame is received in the output frame period and the value 0 indicates that no input frame is received in the output frame period. When the front-end video provider sends an input frame to the video processor, it may provide the input update signal for the video processor to indicate the delivery of the input frame. The new phase start indication is used to indicate the status of the phase coefficients, where the value 1 indicates that the phase coefficient of the last output frame plus the phase step reaches 1 or tends to exceed 1 and thus starts a new phase cycle by restarting to accumulate from 0. The buffer stage value may be in a default value initially. In this embodiment, the default value is 0. Since the buffer stage value is used to represent the number of input frames in the frame buffer having not been used to generate the interpolated frame, the buffer stage value may be increased by 1 in response to the arrival of a new input frame, and may be decreased by 1 in response to the start of a new phase cycle where the phase coefficient reaches 1 and restarts to accumulate from 0. In this embodiment, the arrival of the new input frame may be indicated by the input update signal, and the new phase cycle may be indicated by the new phase start indication.

More specifically, if a new input frame is received, the buffer stage value will be increased by 1 as the new input frame enters the frame buffer. If the phase coefficient reaches 1 and restarts to accumulate from 0, which means that the interpolated frame may be generated based on the next input frame set, the buffer stage value will be decreased by 1 since one more input frame in the frame buffer is applied to generate the interpolated frame.

For example, in the output frame period index 4, the input frame B arrives and thus the buffer stage value is increased by 1; and meanwhile, a new phase starts and the phase coefficient restarts to accumulate from 0, and thus the buffer stage value is decreased by 1. With the combination of the increasing and decreasing operations, the buffer stage value will be unchanged, i.e., keep at 0 in the output frame period index 4. Similarly, in the output frame period index 6, the input frame C arrives and thus the buffer stage value is increased by 1; and meanwhile, a new phase starts and the phase coefficient returns to 0, and thus the buffer stage value is decreased by 1. With the combination of the increasing and decreasing operations, the buffer stage value will still remain unchanged and keep at 0.

However, in the output frame period index 8, the input frame D arrives earlier than its expected arrival time (i.e., index 9). In such a situation, the input update signal indicates that a new input frame arrives and thus the buffer stage value is increased by 1. Meanwhile, the phase coefficient increases to 4/5 without entering a new phase cycle. As a result, the buffer stage value becomes 1 in the output frame period index 8, and the video processor will select the input frame set for generating the interpolated frame according to the buffer stage value.

More specifically, if the buffer stage value equals the default value (e.g., 0), the video processor may select the newly arrived input frame as the current frame and select the previously received input frame (prior to the newly arrived input frame) as the previous frame for generating the interpolated frame. For example, in the output frame period index 4 where the buffer stage value equals 0, the newly arrived/received input frame B is selected as the current frame and its previous frame A is selected as the previous frame for performing interpolation to generate the interpolated frame. In the output frame period index 6 where the buffer stage value equals 0, the newly arrived/received input frame C is selected as the current frame and its previous frame B is selected as the previous frame for performing interpolation to generate the interpolated frame.

If the buffer stage value is greater than the default value (e.g., increased to 1), the video processor may select a previously received input frame as the current frame and select another previously received input frame (which is prior to the input frame selected as the current frame) as the previous frame for generating the interpolated frame. For example, in the output frame period index 8 where the buffer stage value equals 1, the previously received input frame C is selected as the current frame and its previous frame B is selected as the previous frame for performing interpolation to generate the interpolated frame.

Note that in the next output frame period (i.e., index 9), the phase coefficient restarts to accumulate from 0 and a new phase cycle starts; hence, the buffer stage value is decreased to 0. Therefore, the video processor may select the newly arrived input frame D as the current frame and its previous frame C as the previous frame for generating the interpolated frame.

In the conventional selection scheme where a reference table is applied to perform interpolation, the video processor may always take the newly arrived input frame and its previous input frame as the frame set to be used for interpolation. This interpolation method may generate abnormal backward movement when an input frame arrives earlier than its expected arrival time. In contrast, according to an embodiment of the present invention, the video processor may select the input frame set to be used for interpolation according to the buffer stage value. Therefore, the selected input frame set may be correct, especially when an input frame arrives earlier; hence, the interpolated frame will be generated and displayed normally and smoothly.

In an embodiment, the buffer stage value may also be used to handle the situation that an input frame is delayed. When the phase coefficient tends to exceed 1 and there is no newly arrived input frame while the buffer stage value is 0 (which means that the frame buffer has no input frame having not been used to perform interpolation), the video processor may not find a newly arrived input frame to be used for interpolation. This situation is called "buffer underflow", which represents that an input frame is expected to be taken to generate the interpolated frame in an output frame period but has not been received in this output frame period. When the buffer underflow occurs, the video processor may still use the same input frame set as in the previous output frame period to generate the interpolated frame (i.e., the frame set remains unchanged), and the phase coefficient is forcibly configured to reach its maximum value.

Table 4 shows the occurrence of buffer underflow due to delay of the input frame D. In the output frame period index 9 where the input frame D is expected to be received, no input frame is actually received while the phase coefficients tend to exceed 1 to enter the next phase cycle. Meanwhile, the buffer stage value equals the minimum value 0, which means that there is no input frame stored in the frame buffer that can be newly taken to the frame set to be used for interpolation; hence, the buffer underflow is determined to occur. In such a situation, the frame set for interpolation remains unchanged, where the input frame C is still selected as the current frame and the input frame B is still selected as the previous frame. The phase coefficient reaches its maximum value, e.g., 127/128, which is the maximum possible value smaller than 1. The generated interpolated frame may be similar to the input frame C with the usage of the maximum phase coefficient before arrival of the input frame D. As a result, the abnormal backward movement may be prevented, and the influences of the delayed input frame may be minimized.

TABLE 4

| | Index | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Input frame | A | | | B | | C | | | | | D | | | E | |
| Input update | 1 | 0 | 0 | 1 | 0 | 1 | 0 | 0 | 0 | 0 | 1 | 0 | 0 | 1 | 0 |
| New phase start | 1 | | | 1 | | 1 | | | | | 1 | | | 1 | |

TABLE 4-continued

| | Index | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Buffer stage | 0 | 0 | 0 | 0 | 0 | 0 | 0 | 0 | 0 | 0 | 0 | 0 | 0 | 0 | 0 |
| Current frame | A | A | A | B | B | C | C | C | C | C | D | D | D | E | E |
| Previous frame | Z | Z | Z | A | A | B | B | B | B | B | C | C | C | D | D |
| Phase coefficient | 0 | 2/5 | 4/5 | 1/5 | 3/5 | 0 | 2/5 | 4/5 | 127/128 | 127/128 | 0 | 2/5 | 4/5 | 1/5 | 3/5 |

Please note that the current frame and the previous frame for interpolation are both taken from the frame buffer.

Supposing that there are totally N frame buffers (or one frame buffer that can contain N input frames) available to the video processor, if the buffer stage value equals N−1, the selected frame set may include the previous (N−1)$^{th}$ input frame prior to the newly arrived input frame (as the current frame) and the previous N$^{th}$ input frame prior to the newly arrived input frame (as the previous frame). The latter may be overwritten by the newly arrived input frame, such that a wrong input frame may be taken to perform interpolation.

The above situation is called "buffer overflow", which represents that a previously received input frame stored in the frame buffer and expected to be taken to generate the interpolated frame is overwritten by a newly arrived/received input frame. In order to solve the buffer overflow problem, when the buffer stage value reaches N−1 (where N is the frame buffer count of the video processor, which indicates that the frame buffer of the video processor is capable of storing N input frames), the buffer stage value may be forcibly decreased by 1, and then the input frame set for interpolation may be selected accordingly; that is, the video processor may proceed to select the frame set for interpolation from the input frames stored in the frame buffer but not overwritten by the currently arrived input frame. Meanwhile, the phase coefficient may be forcibly configured to restart to accumulate from 0.

Table 5 shows the occurrence of buffer overflow due to earlier arrival of the input frames F and G. In this embodiment, the frame buffer count is 3, which means that the frame buffer of the video processor is capable of storing at most 3 input frames, and this frame buffer may include 3 buffer units B0, B1 and B2, as shown in Table 5. Therefore, the buffer overflow occurs when the buffer stage value reaches 2.

TABLE 5

| | Index | | | | | | | | | | | |
|---|---|---|---|---|---|---|---|---|---|---|---|---|
| | ... | 6 | 7 | 8 | 9 | 10 | 11 | 12 | 13 | 14 | 15 | 16 | 17 |
| Input frame | | C | | | D | | E | F | G | | | H | |
| Input update | ... | 1 | 0 | 0 | 1 | 0 | 1 | 1 | 1 | 0 | 0 | 1 | 0 |
| New phase start | ... | 1 | | | 1 | | 1 | 0 | 0→1 | | | 1 | |
| Buffer stage | ... | 0 | 0 | 0 | 0 | 0 | 0 | 1 | 2→1 | 1 | 1 | 1 | 1 |
| Current frame | ... | C | C | C | D | D | E | E | F | F | F | G | G |
| Previous frame | | B | B | B | C | C | D | D | E | E | E | F | F |
| Phase coefficient | ... | 0 | 2/5 | 4/5 | 1/5 | 3/5 | 0 | 2/5 | 0 | 2/5 | 4/5 | 1/5 | 3/5 |
| Buffer unit B0 | | A | A | A | D | D | D | D | G | G | G | G | G |
| Buffer unit B1 | ... | B | B | B | B | B | E | E | E | E | E | H | H |
| Buffer unit B2 | | C | C | C | C | C | C | F | F | F | F | F | F |

In detail, the received input frames are sequentially written into the buffer units B0, B1 and B2, iteratively. In this embodiment, the input frame D is written into the buffer unit B0 to overwrite the input frame A, the input frame E is written into the buffer unit B1 to overwrite the input frame B, the input frame F is written into the buffer unit B2 to overwrite the input frame C, and the input frame G is written into the buffer unit B0 to overwrite the input frame D. In the output frame periods with indices 12 and 13, the input frames F and G arrive rapidly and earlier than expected, and the buffer stage value tends to reach 2 when the input frame G arrives, where the buffer overflow is determined to occur and the input frame G overwrites the input frame D in the buffer unit B0. In such a situation, the buffer stage value is decreased from 2 to 1, and the frame set is selected based on the decreased buffer stage value 1, where the video processor proceeds to select the input frame F as the current frame and select the input frame E as the previous frame to perform interpolation. Meanwhile, the phase coefficient is forcibly configured to enter a new phase cycle and restart to accumulate from 0, as can be indicated by the new phase start indication. Subsequently, the arrival of the follow-up input frame H returns to the regular timing; hence, the frame set may be selected in a normal sequence based on the buffer stage value, and the phase coefficients may be accumulated normally with the regular phase step 2/5.

In this case, if the frame set for interpolation is selected without considering the buffer overflow situation, the input frame E stored in the buffer unit B1 is expectedly taken as the current frame and the input frame D stored in the buffer unit B0 is expectedly taken as the previous frame for interpolation in the output frame period index 13 (where the phase coefficient may be ⅘). However, the input frame D stored in the buffer unit B0 is overwritten by the input frame G which arrives earlier to cause overflow, resulting in that a wrong input frame is taken to perform interpolation. In contrast, the determination of buffer overflow and the related operations provided in the present invention ensure that the appropriate input frames may be selected as the frame set used for performing interpolation, allowing the output video to be smoother.

Based on the buffer stage value, the video processor may select appropriate input frames to perform interpolation, and take appropriate measures when the buffer overflow or underflow occurs under a limited frame buffer count. The determination may be performed dynamically in each output frame period; hence, the buffer stage value may be readily updated, allowing the frame set for interpolation may be selected adaptively. Even if the input irregularity is severe such that the input frames arrive continuously and rapidly or no input frame arrives in a long time, the frame interpolation may also be well handled under the buffer overflow or underflow situation. The above methods allow the video processor to select an optimal frame set for interpolation, ensuring that the output video may not move back abnormally. Further, in order to make the output video smoother, the present invention provides a novel method for adjusting or modifying the phase step when an irregular input occurs.

Figure 3:
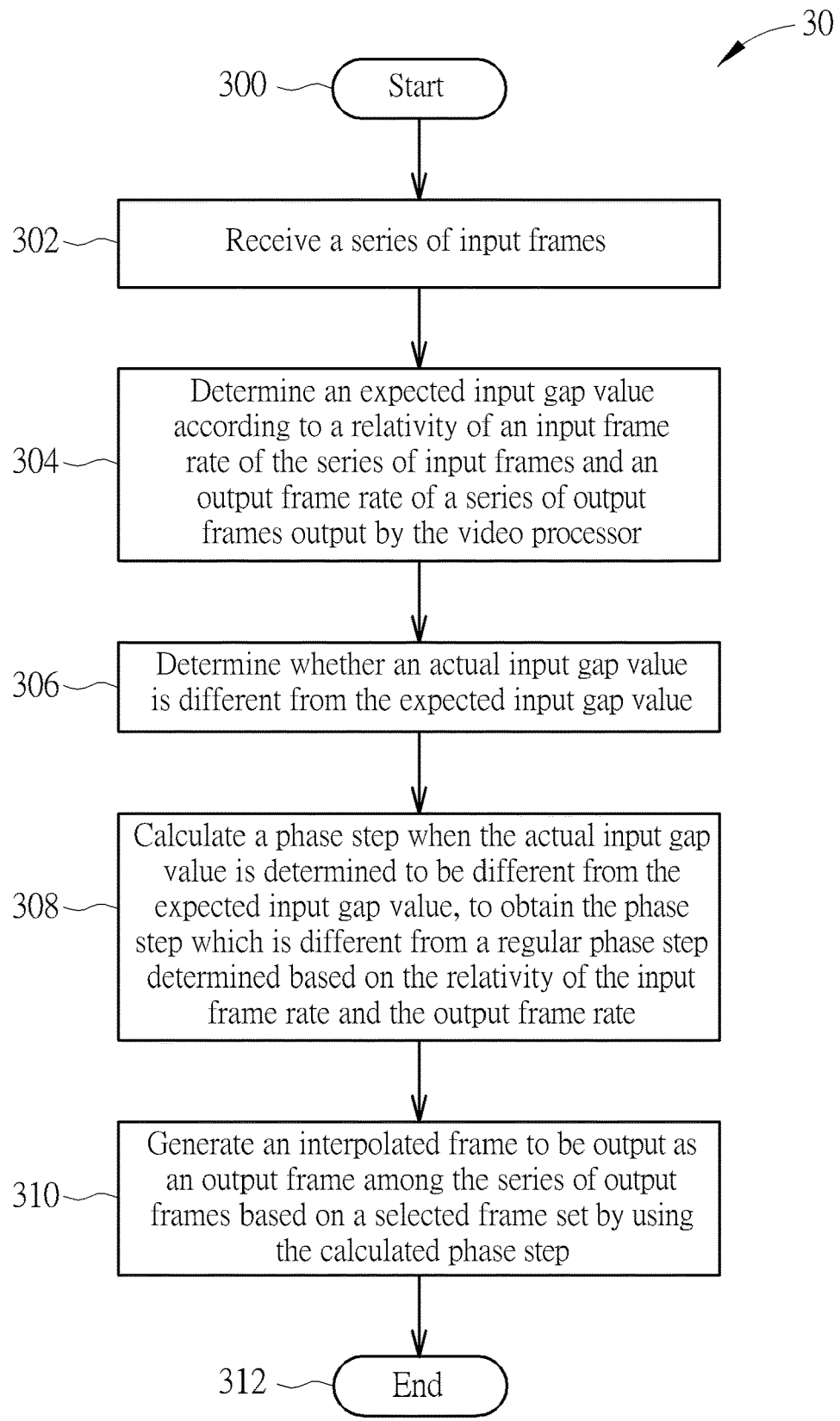
FIG. 3 is a flowchart of another image processing process according to an embodiment of the present invention.

FIG. 3 is a flowchart of an image processing process 30 according to an embodiment of the present invention. The image processing process 30 may be implemented in a video processor, such as the video processor 106 shown in FIG. 1. As shown in FIG. 3, the image processing process 30 includes the following steps:

Step 300: Start.

Step 302: Receive a series of input frames.

Step 304: Determine an expected input gap value according to a relativity of an input frame rate of the series of input frames and an output frame rate of a series of output frames output by the video processor.

Step 306: Determine whether an actual input gap value is different from the expected input gap value.

Step 308: Calculate a phase step when the actual input gap value is determined to be different from the expected input gap value, to obtain the phase step which is different from a regular phase step determined based on the relativity of the input frame rate and the output frame rate.

Step 310: Generate an interpolated frame to be output as an output frame among the series of output frames based on a selected frame set by using the calculated phase step.

Step 312: End.

According to the image processing process 30, the video processor may receive a series of input frames (Step 302). In an embodiment, the series of input frames may be received by the video processor from a front-end device. The front-end device may be the video provider 12 shown in FIG. 1.

As for each received input frame, the video processor may generate an expected input gap value (abbreviated as "expected value" hereinafter) and an actual input gap value (abbreviated as "actual value" hereinafter). In detail, the expected value is determined according to the relativity of the input frame rate of the input frames received by the video processor and the output frame rate of the output frames output by the video processor (Step 304). For example, in the application where a 30 Hz input video is converted into a 60 Hz output video, the expected value for each input frame is always 2; in the application where a 24 Hz input video is converted into a 60 Hz output video, the expected value may be 3 and 2 alternately for a series of input frames.

In addition, the video processor may determine the actual value according to the input timing of the input frames, and keep monitoring the actual value to determine whether each actual value is the same as or different from the corresponding expected value (Step 306). If the input frames arrive with the regular timing of the input sequence, the actual value will always be the same as the corresponding expected value. If an input frame arrives earlier or later than its expected arrival time, this irregular input timing will result in that the actual value is different from the expected value.

When the actual value is the same as the expected value, the regular phase step is applied. For example, in the application where a 24 Hz input video is converted into a 60 Hz output video, the video processor may apply the phase step ⅖, and in the application where a 30 Hz input video is converted into a 60 Hz output video, the video processor may apply the phase step ½. On the other hand, when the actual value is determined to be different from the expected value, the video processor may recalculate the phase step to be adapted to the irregular input timing (Step 308). The calculated phase step may be different from the regular phase step determined based on the relativity of the input frame rate and the output frame rate. The video processor thereby generates an interpolated frame to be output as an output frame based on a selected frame set (which may be determined according to the buffer stage value as described in the above embodiments) by using the calculated phase step (Step 310). In other words, the phase step will have a normal value under a regular input timing, and may be recalculated to have another value different from its normal value when the irregular input timing appears. The value of the phase step may be dynamically calculated according to the actual input timing of the input frames, as described below.

Table 6 lists the expected values and the actual values corresponding to a series of input frames received in multiple continuous output frame periods. Table 6 shows the input timing of the input frames, and includes parameters such as the input update signal, the current frame and the previous frame (i.e., the frame set) used for generating the interpolated frame, and the phase coefficient for interpolation. These parameters are identical to those included in the above tables, and will not be detailed herein.

TABLE 6

|  | Index | | | | | | | | | | | | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 |
| Input frame | A |  |  | B |  | C |  |  | D |  | E |  |  | F |  |
| Input update | 1 | 0 | 0 | 1 | 0 | 1 | 0 | 0 | 1 | 0 | 1 | 0 | 0 | 1 | 0 |
| FCV | 0 | 1 | 2 | 0 | 1 | 0 | 1 | 2 | 0 | 1 | 0 | 1 | 2 | 0 | 1 |
| Actual value | 2 |  |  | 3 |  | 2 |  |  | 3 |  | 2 |  |  | 3 |  |

TABLE 6-continued

| | Index | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Expected value | 2 | | | 3 | | 2 | | | 3 | | 2 | | | 3 | |
| Current frame | A | A | A | B | B | C | C | C | D | D | E | E | E | F | F |
| Previous frame | Z | Z | Z | A | A | B | B | B | C | C | D | D | D | E | E |
| Phase coefficient | 0 | 2/5 | 4/5 | 1/5 | 3/5 | 0 | 2/5 | 4/5 | 1/5 | 3/5 | 0 | 2/5 | 4/5 | 1/5 | 3/5 |

Table 6 further lists a frame counting value (FCV), which is used to count the number of output frame periods from reception of the previous input frame. The frame counting value is reset to 0 in response to the arrival of a new input frame, and then starts to count by considering this arrived input frame as the previous input frame. The frame counting value may reach a value representing the number of output frame periods between a newly arrived current input frame and the previous input frame.

Therefore, the actual value and the expected value may be calculated by using the counting result of the frame counting value based on the expected reception of the input frames and the actual reception of the input frames, respectively. More specifically, the expected value may represent the number of output frame periods expectedly passing by from reception of the previous input frame to reception of the current input frame. In this embodiment where the input frame rate is 24 Hz and the output frame rate is 60 Hz, the expected value may be 3 and 2 alternately. For example, the expected value for the input frame A is 2, the expected value for the input frame B is 3, the expected value for the input frame C is 2, and so on.

The actual value may represent the number of output frame periods actually passing by from reception of the previous input frame to reception of the current input frame. Therefore, the actual value may be updated in response to the arrival of a new input frame. In this embodiment as shown in Table 6, the input frames arrive following the regular timing, and thus the actual value is always the same as the expected value. In such a situation, the video processor may perform interpolation using the phase coefficients calculated by applying the regular phase step, i.e., 2/5, which is determined based on the relativity of the 24 Hz input frame rate and the 60 Hz output frame rate.

Table 7 shows that the actual value is different from the expected value due to irregular input timing of the input frames according to an embodiment of the present invention. In Table 7, the input frame F arrives earlier in the output frame period index 13, causing that the actual value is different from the expected value for the input frame F. More specifically, the expected value for the input frame F is 3 based on the input timing corresponding to the application of 24 Hz to 60 Hz conversion, but the earlier arrival of the input frame F causes that the actual value for the input frame F is 2. After detecting that the actual value is different from the expected value, the video processor may recalculate the phase step and obtain that the phase step equals 9/20, and then generate subsequent phase coefficients according to the recalculated phase step 9/20.

TABLE 7

| | Index | | | | | | | | | | | | | | |
|---|---|---|---|---|---|---|---|---|---|---|---|---|---|---|---|
| | ... | 6 | 7 | 8 | 9 | 10 | 11 | 12 | 13 | 14 | 15 | 16 | 17 | 18 | 19 | 20 |
| Input frame | ... | C | | | D | | E | | F | | | G | | H | | |
| Input update | ... | 1 | 0 | 0 | 1 | 0 | 1 | 0 | 1 | 0 | | 1 | 0 | 1 | 0 | 0 |
| FCV | ... | 0 | 1 | 2 | 0 | 1 | 0 | 1 | 0 | 1 | 2 | 0 | 1 | 0 | 1 | 2 |
| Actual value | ... | 2 | | | 3 | | 2 | | 2 | | | 3 | | 2 | | |
| Expected value | ... | 2 | | | 3 | | 2 | | 3 | | | 3 | | 2 | | |
| New phase start | ... | 1 | | | 1 | | 1 | | 1 | | | 1 | | 1 | | |
| Rest input frame | ... | 2 | | | 1 | | 2 | | 1 + 1 | | | 1 | | 2 | | |
| Rest output frame | ... | 5 | 4 | 3 | 2 | 1 | 5 | 4 | 3 | 2 + 2 | 3 | 2 | 1 | 5 | 4 | 3 |
| Phase step | ... | 2/5 | 2/5 | 2/5 | 2/5 | 2/5 | 2/5 | 2/5 | 2/5 | 2/5 | 9/20 | 9/20 | 9/20 | 9/20 | 2/5 | 2/5 |
| Current frame | ... | C | C | C | D | D | E | E | E | F | F | G | G | H | H | H |
| Previous frame | ... | B | B | B | C | C | D | D | D | E | E | F | F | G | G | G |
| Phase coefficient | ... | 0 | 2/5 | 4/5 | 1/5 | 3/5 | 0 | 2/5 | 4/5 | 1/5 | 13/20 | 2/20 | 11/20 | 0 | 2/5 | 4/5 |

After several output frame periods applied with the recalculated phase step 9/20, the video processor may find that the phase coefficient returns to 0 and the input frames return to follow the regular timing; hence, the video processor may restart to apply the regular phase step 2/5 with the appropriate frame set to proceed the interpolation.

Table 7 further lists two parameters: a rest input frame count and a rest output frame count. The reset input frame count represents the number of rest input frames to be used for generating the interpolated frame in the cycle determined based on the relativity of the input frame rate and the output frame rate, and the rest output frame count represents the number of rest output frames to be generated and output in the same cycle. In other words, the reset input frame count refers to the input frame(s) to be used for interpolation in rest output frame periods in the cycle, and the rest output frame count refers to the output frame(s) to be output in rest output frame periods in the cycle. In this embodiment where the input frame rate is 24 Hz and the output frame rate is 60 Hz, each cycle may include 5 output frame periods. Therefore, in a cycle where the input frames arrive regularly, the rest input frame count may start from 2 and then count down in response to the new phase start indication (where the phase enters a new phase cycle and the frame set for interpolation is updated), and the rest output frame count may start from 5 and then count down in each output frame period where an output frame is output.

When irregular arrival of an input frame occurs, the video processor may calculate the phase step according to the rest input frame count and the rest output frame count. For example, in the output frame period index 13, the video processor finds that the actual value is different from the expected value, and thereby starts the recalculation procedure of phase step. The video processor may first update the values of the rest input frame count and the rest output frame count based on the current statuses of input frames, output frames and phase coefficients.

More specifically, the processor may add 1 to the rest input frame count to generate an updated rest input frame count, and add the present actual value (i.e., actual input gap value) to the rest output frame count to generate an updated rest output frame count. In the embodiment of Table 7, this operation is performed in the output frame period index 14, where the rest input frame count is added by 1, and the rest output frame count is added by 2, which is the actual value for the early arrived input frame F.

Therefore, the phase step may be obtained by taking the updated rest input frame count minus the present phase coefficient, which is then divided by the updated rest output frame count, as the formula below:

$$\text{Phase\_step} = \frac{\text{Rest\_Input\_Frame\_Cnt} - \text{Present\_Phase}}{\text{Rest\_Output\_Frame\_Cnt}}.$$

Please note that the regular phase step is typically determined based on the relativity of the input frame rate and the output frame rate. With the phase step, the MEMC operation allows the image information of one or more input frames to be evenly spread over multiple output frames based on their frame rates, so as to generate a smooth output video having a higher frame rate. The recalculated phase step in the embodiments of the present invention may also conform to a similar concept; that is, the image information of an irregularly arrived input frame should also be evenly spread over multiple output frames, so that the influences on the output video caused by the irregular arrival may be minimized. The calculation based on the rest input frame count and the rest output frame count helps achieve this purpose.

For example, in the embodiment of Table 7, the input frame F arrives earlier in the output frame period index 13; hence, the phase coefficient for generating the interpolated frame should proceed faster to be adapted to the earlier arrival of the input frame F, and thus a larger phase step should be applied. In this embodiment, the obtained phase step equals 9/20, which is slightly greater than the regular phase step 2/5. In detail, the rest input frame count is used to monitor the input status. The rest input frame count is added by 1, which means that the next input frame G is taken into account for recalculating the phase coefficients. This updated rest input frame count is then subtracted by the present phase coefficient (i.e., 1/5), which means that the passing phase value is excluded in the calculation, and only the rest phase value is taken into account. The rest output frame count is used to monitor the output status. Correspondingly, as the denominator of the formula for calculating the phase step, the rest output frame count is added by the actual value (i.e., 2), to generate the updated rest output frame count equal to 4, which means that the next phase cycle corresponding to the input frame G is taken into account for spreading the influence of the irregular input. In this embodiment, the phase step may be calculated and obtained as:

$$\text{Phase\_step} = \frac{\text{Rest\_Input\_Frame\_Cnt} - \text{Present\_Phase}}{\text{Rest\_Output\_Frame\_Cnt}} = \frac{2 - 1/5}{4} = \frac{9}{20}.$$

In such a situation, this phase step may be applied in subsequent 4 output frame periods which are specified by the value of the updated rest output frame count 4. In other words, the calculated phase step may be effective until the rest output frame count tends to be 0 and returns to its maximum value 5. For example, in the embodiment of Table 7, the phase step 9/20 is applied in 4 output frame periods with indices 15-18, and the phase coefficient will return to 0. Subsequently, the video processor restarts to use the regular phase step 2/5 to perform interpolation since the follow-up input frames are received with the regular timing.

In this embodiment, the irregular input frame F arrives in the output frame period index 13. The video processor then updates the rest input frame count and the rest output frame count in the next output frame period index 14, to calculate and obtain the phase step. This calculated phase step then starts to be applied in the next output frame period index 15. Based on this appropriate rule associated with the phase step calculation, the influences of irregular input may be evenly spread over multiple output image frames, to make the output video smooth and minimize the influences of the irregular input. In addition, the phase step and related phase coefficients may be dynamically determined based on the timing of the input frames; hence, an appropriate phase step may be obtained in any irregular case. In other words, the method of calculating the phase step is applicable to various irregular scenarios such as earlier arrival of an input frame and delay of an input frame. The parameters for phase step calculation allow the phase coefficient to converge to 0 at the end of the phase adjustment period. Therefore, the subsequent phase coefficients may proceed normally based on the regular phase step.

In addition, the method of dynamically calculating the phase step is also applicable to a more complex case. For example, if the phase step is calculated or adjusted due to a first irregular input frame, and a second irregular input frame arrives during the above phase adjustment period, the phase step may further be recalculated to be adapted to the second irregular input frame, and the phase coefficient will follow the newly calculated phase step, until the input frames become regular and the phase coefficient returns to be normal.

As mentioned above, conventionally the phase step is determined by referring to a reference table based on the input frame rate and the output frame rate. Even when an irregular input problem occurs and thus the input frame arrives irregularly, the reference table is only applicable to a few typical cases. In contrast, the image processing method of the present invention can dynamically monitor the input status (e.g., monitoring the actual value and the expected value) and correspondingly calculate the phase step based on the parameters such as the rest input frame count and the rest output frame count. Therefore, the video processor may calculate and obtain an appropriate phase step under different scenarios, which are not limited to the cases predictable by the reference table. In such a situation, the present invention may handle more complex input irregularity situations, and surpass the conventional method using the reference table.

Please note that the present invention aims at providing an image processing method for handling irregular input and a related video processor. Those skilled in the art may make modifications and alterations accordingly. For example, in the above embodiments, the output frame rate is 60 Hz, and the input frames are received in 24 Hz without cadence or pulldown. In another embodiment, the image processing method of the present invention may be applicable to the input frames with cadence or pulldown that may be received in 60 Hz, as the input series A1, A2, A3, B1, B2 . . . . For example, in an embodiment, the frame difference value may be used to derive the frame counting value, so as to determine the actual value; hence, the video processor may determine the irregular input and calculate the phase step in the same manner.

Similarly, the input frames with cadence may also be applicable to the embodiments of selecting the frame set for interpolation according to the buffer stage value. In an exemplary embodiment, the repeated input frames may be written into the same buffer unit. For example, the input frame A2 is configured to overwrite its previous input frame A1, and the input frame A3 is configured to overwrite its previous input frame A2. The next input frame B1 may be written into the next buffer unit. Based on this rule of writing the input frames into the frame buffer, the buffer stage value may be calculated in the same manner, and the frame set for interpolation may be selected accordingly. The buffer overflow and buffer underflow may also be determined according to the buffer stage value in the same manner.

Figure 4:
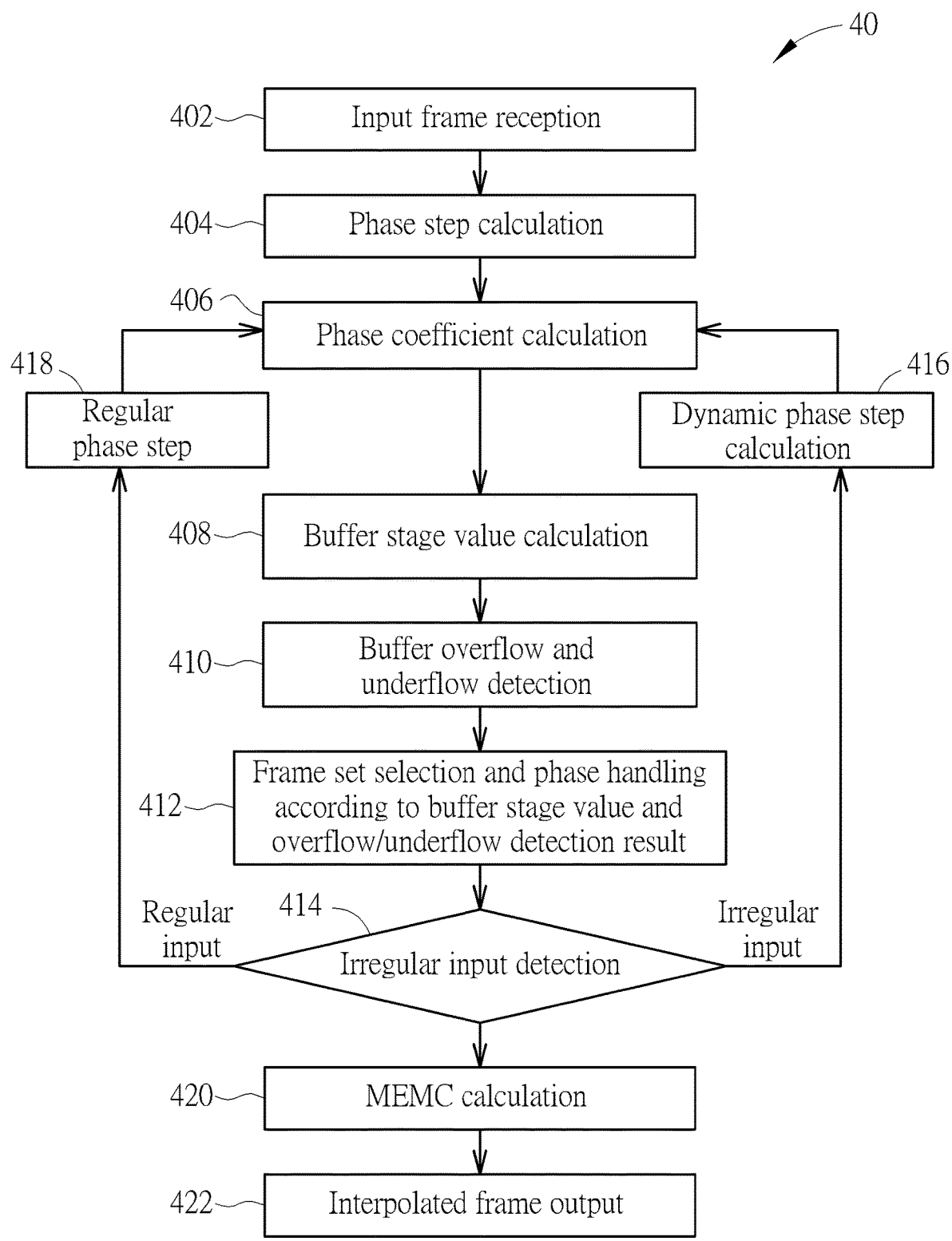
FIG. 4 is a flowchart of a further image processing process according to an embodiment of the present invention.

In an embodiment, the method of selecting the frame set for interpolation and the method of calculating the phase step may be performed cooperatively to achieve a comprehensive image processing process. FIG. 4 is a flowchart of an image processing process 40 according to an embodiment of the present invention. The image processing process 40 may be a combination of the implementations of frame set selection and phase step calculation, and may also be implemented in a video processor such as the video processor 106 shown in FIG. 1. As shown in FIG. 4, the image processing process 40 includes the following steps:

Step 402: Receive an input frame.
Step 404: Calculate the phase step.
Step 406: Calculate the phase coefficient according to the phase step.
Step 408: Calculate the buffer stage value according to the input frames stored in the frame buffer.
Step 410: Detect buffer overflow and buffer underflow according to the buffer stage value.
Step 412: Select the frame set for interpolation and adjust the phase coefficient according to the buffer stage value and the detection result of buffer overflow and buffer underflow.
Step 414: Detect an irregular input frame.
Step 416: If the input frame is irregular, calculate the phase step dynamically.
Step 418: If the input frame is regular, apply the regular phase step.
Step 420: Perform MEMC to generate an interpolated frame.
Step 422: Output the interpolated frame as an output frame.

Note that the image processing method of the present invention is dynamically performed in each output frame period; hence, the image processing process 40 may specify the operations of the video processor in an output frame period. First, the video processor may receive an input frame and write the input frame into the frame buffer (Step 402). An input frame may be received in some output frame periods (e.g., without pulldown) or in every output frame period (e.g., with pulldown). The video processor then calculates the regular phase step based on the relativity of the input frame rate and the output frame rate (Step 404). Therefore, the phase coefficient may be calculated according to the phase step through accumulation, where the current phase coefficient is equal to the previous phase coefficient added by the phase step (Step 406).

The video processor then calculates the buffer stage value based on the status of input frames stored in the frame buffer (Step 408). More specifically, the buffer stage value may be increased by 1 in response to the arrival/reception of an input frame, and decreased by 1 in response to the start of a new phase cycle. According to the dynamically changed buffer stage value, the video processor may detect the occurrence of buffer overflow and buffer underflow (Step 410). The buffer overflow and underflow indicate that the input frames and the interpolated frames (i.e., output frames) are imbalanced. The buffer overflow occurs when the input frame arrives much faster than the generation of interpolated frames such that a previous input frame expected to be used for interpolation is overwritten by a newly arrived input frame. The buffer underflow occurs when the input frame is delayed too long such that an input frame expected to be used for the present interpolation has not been received and written into the frame buffer.

Subsequently, the frame set for interpolation is selected according to the buffer stage value, and the phase coefficient may be adjusted if the detection result indicates that a buffer overflow or underflow occurs (Step 412). When the buffer overflow occurs, the frame set for interpolation is changed to use the stored input frames not overwritten by the currently arrived input frame, and the phase coefficient is forcibly configured to start a new phase cycle. When the buffer underflow occurs, the video processor takes the same input frame set as in the previous output frame period, and the phase coefficient is forcibly configured to reach its maximum value.

The video processor then detects and determines whether the received input frame is regular or irregular (Step 414). An irregular input frame appears if the input frame arrives in a non-expected output frame period; this may be indicated through the comparison of the actual value and the expected value. If the input frame is determined to be regular (i.e., arrives in an expected output frame period), the video processor may apply the regular phase step to be used to calculate the phase coefficient of the next output frame period (Step 418). If the input frame is determined to be irregular (i.e., arrives in a non-expected output frame period), the video processor may dynamically and adaptively calculate the phase step to be used to calculate the phase coefficient of the next output frame period (Step 416).

The phase step may be calculated by referring to the rest input frame count and the rest output frame count.

Subsequently, the video processor may perform MEMO to generate the interpolated frame by selecting the frame set based on the above selection scheme and using the phase step and phase coefficient calculated based on the above procedure (Step 420). The interpolated frame may be used as an output frame to be output to the display panel (Step 422).

To sum up, the present invention provides an image processing method used for the video processor to handle the irregular input problem. In an embodiment, the video processor may monitor the buffer stage value, which indicates the status of input frames stored in the frame buffer. Based on the buffer stage value, the video processor may select appropriate input frames as the frame set for interpolation, and determine the occurrence of buffer overflow or buffer underflow, so as to take appropriate measures. In an embodiment, the video processor may detect the input timing of the input frame to determine whether the input frame follows the regular timing. If an irregular input occurs, the video processor may calculate the phase step accordingly, allowing the influences of irregular input to be evenly spread over multiple follow-up output frames, to make the output video smooth and minimize the influences of the irregular input.

In addition, in an embodiment, the video processor may first determine and handle the situation of buffer overflow or buffer underflow based on the status of the frame buffer, in order to determine the appropriate frame set, where the phase coefficient may also be well controlled if the buffer overflow or underflow occurs. The video processor may then determine the occurrence of irregular input. If the irregular input does not cause buffer overflow or underflow, which means that this irregular input may be well handled by using the available frame buffer, the phase step calculation scheme may be applied to generate appropriate phase step and phase coefficient. In such a situation, by dynamically determining the frame set for interpolation and calculating the phase step while considering the status of the frame buffer, the video processor of the present invention may handle various irregular scenarios. Therefore, as for the MEMC operation performed in each output frame period, the video processor may select the optimal frame set from the frame buffer, and calculate and obtain an appropriate phase step. As a result, the video processor may generate a smooth output video in any irregular input scenario, and the influences of irregular input may be minimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of a video processor, configured to perform the following steps:
   receiving a series of input frames;
   calculating a buffer stage value according to the series of input frames, wherein the buffer stage value corresponds to a status of the input frames stored in a frame buffer of the video processor; and
   selecting a frame set from the input frames stored in the frame buffer for generating an interpolated frame as an output frame to be output by the video processor according to the buffer stage value.

2. The video processor of claim 1, wherein the buffer stage value represents the number of input frames stored in the frame buffer that have not been used to generate the interpolated frame.

3. The video processor of claim 1, wherein the buffer stage value is increased by 1 in response to an arrival of a new input frame among the series of input frames, and the buffer stage value is decreased by 1 in response to a start of a new phase cycle.

4. The video processor of claim 1, wherein the step of selecting the frame set from the input frames stored in the frame buffer for generating the interpolated frame comprises:
   selecting a newly arrived input frame among the series of input frames as a current frame and selecting a previously received input frame among the series of input frames as a previous frame for generating the interpolated frame when the buffer stage value equals a default value.

5. The video processor of claim 4, wherein the default value is 0.

6. The video processor of claim 4, wherein the step of selecting the frame set from the input frames stored in the frame buffer for generating the interpolated frame further comprises:
   selecting a first previously received input frame among the series of input frames as the current frame and a second previously received input frame prior to the first previously received input frame as the previous frame for generating the interpolated frame when the buffer stage value is greater than the default value.

7. The video processor of claim 1, further configured to determine whether a buffer underflow occurs according to the buffer stage value, wherein the buffer underflow represents that an input frame among the series of input frames expected to be taken to generate the interpolated frame in an output frame period has not been received in the output frame period.

8. The video processor of claim 7, wherein a phase coefficient reaches a maximum value and the frame set used to generate the interpolated frame remains unchanged when the buffer underflow is determined to occur.

9. The video processor of claim 1, further configured to determine whether a buffer overflow occurs according to the buffer stage value, wherein the buffer overflow represents that a previously received input frame among the series of input frames stored in the frame buffer and expected to be taken to generate the interpolated frame is overwritten by a newly received input frame among the series of input frames.

10. The video processor of claim 9, wherein the step of determining whether the buffer overflow occurs according to the buffer stage value comprises:
    determining that the buffer overflow occurs when the buffer stage value equals a frame buffer count of the video processor minus 1.

11. The video processor of claim 1, wherein the buffer stage value is forcibly decreased by 1 and then the frame set is selected according to the buffer stage value when the buffer overflow is determined to occur.

12. A method of a video processor, configured to perform the following steps:
    receiving a series of input frames;
    determining an expected input gap value according to a relativity of an input frame rate of the series of input frames and an output frame rate of a series of output frames output by the video processor;

determining whether an actual input gap value is different from the expected input gap value;

calculating a phase step when the actual input gap value is determined to be different from the expected input gap value to obtain the phase step which is different from a regular phase step determined based on the relativity of the input frame rate and the output frame rate; and generating an interpolated frame to be output as an output frame among the series of output frames based on a selected frame set by using the calculated phase step.

13. The video processor of claim 12, wherein the expected input gap value represents the number of output frame periods expectedly passing by from reception of a previous input frame among the series of input frames to reception of a current input frame among the series of input frames, and the actual input gap value represents the number of output frame periods actually passing by from reception of the previous input frame to reception of the current input frame.

14. The video processor of claim 12, wherein the step of calculating the phase step comprises:

calculating the phase step according to a rest input frame count and a rest output frame count, wherein the rest input frame count represents the number of rest input frame to be used for generating the interpolated frame in a cycle determined based on the relativity of the input frame rate and the output frame rate, and the rest output frame count represents the number of rest output frame in the cycle.

15. The video processor of claim 14, wherein when the actual input gap value is determined to be different from the expected input gap value, 1 is added to the rest input frame count to generate an updated rest input frame count, and the present actual input gap value is added to the rest output frame count to generate an updated rest output frame count.

16. The video processor of claim 15, wherein the phase step is calculated by taking the updated rest input frame count minus a present phase coefficient then divided by the updated rest output frame count.

17. The video processor of claim 12, wherein the calculated phase step is effective until the rest output frame count tends to be 0 and returns to a maximum value.

18. The video processor of claim 12, wherein the actual input gap value different from the expected input gap value indicates an irregular input timing of an input frame among the series of input frames.

19. The video processor of claim 12, further comprising:

applying the regular phase step when the actual input gap value is determined to be the same as the expected input gap value.

20. A video processor configured to perform the steps of claim 1.

21. A video processor configured to perform the steps of claim 12.

* * * * *